United States Patent
Choo et al.

(10) Patent No.: US 8,121,576 B2
(45) Date of Patent: Feb. 21, 2012

(54) LINEARITY OF AN RF RECEIVE PATH BY SPURIOUS TONE SUPPRESSION

(75) Inventors: Hunsoo Choo, Plano, TX (US); Imtinan Elahi, Richardson, TX (US); Khurram Muhammad, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 428 days.

(21) Appl. No.: 12/492,413

(22) Filed: Jun. 26, 2009

(65) Prior Publication Data
US 2010/0330942 A1 Dec. 30, 2010

(51) Int. Cl.
*H04B 1/10* (2006.01)
*H04K 3/00* (2006.01)

(52) U.S. Cl. ........................ 455/296; 455/285

(58) Field of Classification Search .................. 455/285, 455/296, 302, 310
See application file for complete search history.

(56) References Cited

U.S. PATENT DOCUMENTS

| | | | |
|---|---|---|---|
| 2005/0248479 A1* | 11/2005 | Shimizu et al. | 341/155 |
| 2007/0202830 A1* | 8/2007 | Muhammad et al. | 455/298 |
| 2009/0134955 A1* | 5/2009 | Sheng et al. | 333/174 |

OTHER PUBLICATIONS

Stuetzle, Doug; "Understanding IP2 and IP3 Issues in Direct Conversion Receivers for WCDMA Wide Area Basestations"; Linear Technology Magazine, Jun. 2008, pp. 10-13 and p. 27.

* cited by examiner

*Primary Examiner* — Lee Nguyen
(74) *Attorney, Agent, or Firm* — Ronald O. Neerings; Wade James Brady, III; Frederick J. Telecky, Jr.

(57) ABSTRACT

A method of increasing linearity of an RF signal receive path includes measuring a signal amplified by the receive path. The receive path has a local oscillator operating at an LO frequency and a ground. An error signal is determined from the amplified signal, the error signal being representative of the nonlinearity. An anti-spur tone is injected into the ground. The anti-spur tone has a frequency about equal to the LO frequency and an amplitude and phase that are determined to increase the linearity of the receive path.

20 Claims, 6 Drawing Sheets

LINEARITY OF AN RF RECEIVE PATH BY SPURIOUS TONE SUPPRESSION

TECHNICAL FIELD

Figure 1:
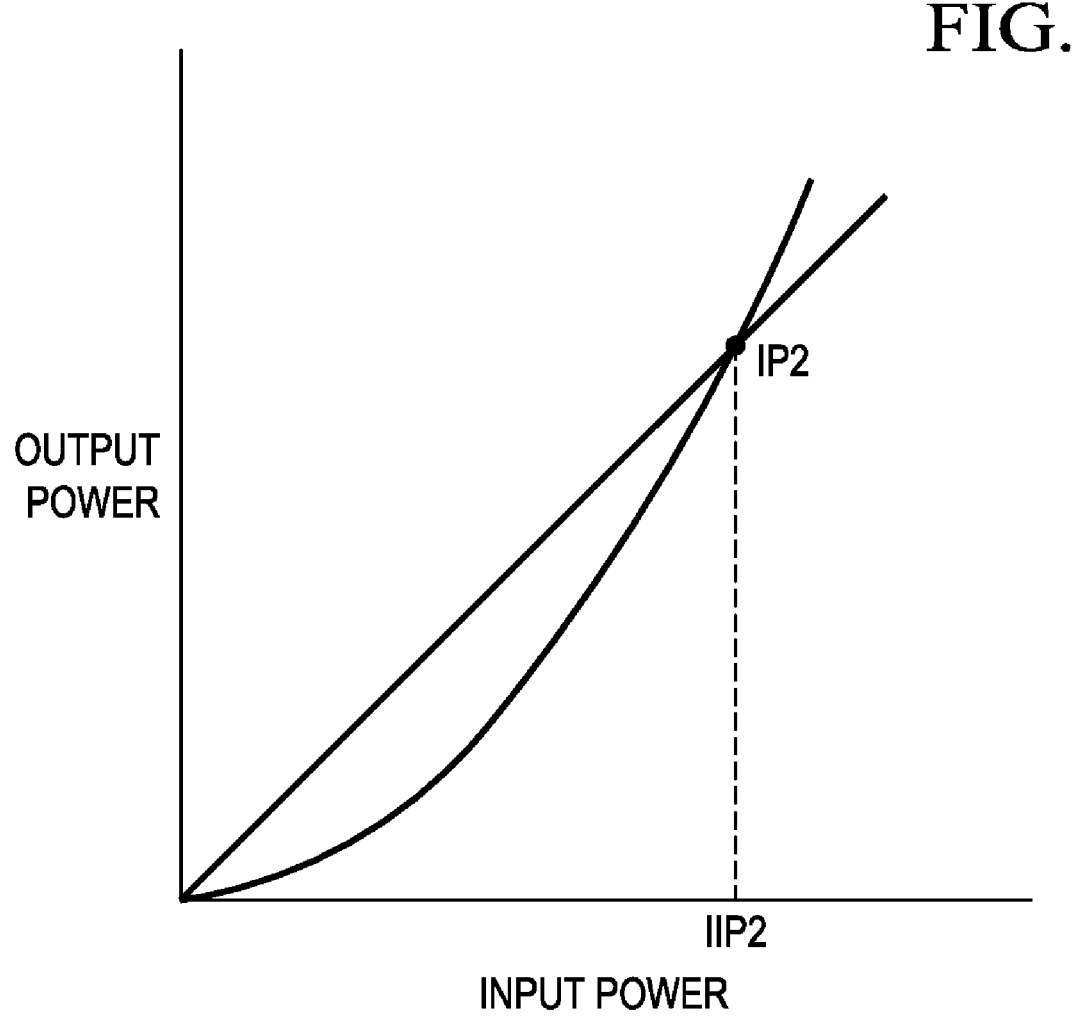

This application is directed, in general, to RF signal processing and, more specifically, to improving linearity of a received RF signal.

BACKGROUND

The demand for wireless products has been growing in recent years, resulting in intensive efforts to develop single chips that have reduced cost, power dissipation and chip size. As chip size is scaled downward, interactions between the various subsystems become increasingly problematic due to their closer proximity and reduced geometries. This is especially true for systems such as wireless transceivers, which require processing of low level and high frequency signals in an environment where digital signals are also employed.

Some interactions may reduce the linearity of an amplifier used to amplify a received RF signal. Nonlinearity may reduce signal fidelity and lead to a reduced operating range of the transceiver. Thus, it is desirable to mitigate interactions that lead to nonlinearity of the amplifier.

SUMMARY

One aspect provides a method of increasing linearity of an RF signal receive path. The receive path has a local oscillator operating at an LO frequency and a ground. The method includes measuring a signal amplified by the receive path. An error signal is determined from the amplified signal, the error signal being representative of the nonlinearity. An anti-spur tone is injected into the ground. The anti-spur tone has a frequency about equal to the LO frequency and an amplitude and phase that are determined to increase the linearity of the receive path.

Another aspect provides a system for increasing linearity of a RF signal receive path. The system includes a spurious tone suppressor that is configurable to inject an anti-spur tone into a ground of the receive path. A tone generator is configured to inject a test tone into an amplifier in the receive path. A controller is configured to determine an error signal based on the test tone. The controller determines a configuration of the spurious tone suppressor in response to the error signal that increases the linearity.

Another aspect provides a mobile communications device. The device includes a receive path that has an associated nonlinearity. The path includes a bandpass filter configured to receive an RF signal from an antenna and to produce a filtered signal. A low-noise amplifier accepts the filtered signal and a test tone. A mixer receives an amplified signal from the low-noise amplifier and produces a down-converted signal. A calibration system includes a controller configured to measure a DC bias of the down-converted signal. The controller commands a tone generator to provide the test tone to the amplifier. The controller is configured to measure the DC bias of the down-converted signal with and without the test tone input to the amplifier, thereby determining an error signal. The controller is further configured to reconfigure the spurious tone suppressor to reduce the nonlinearity by reducing the error signal.

BRIEF DESCRIPTION

Figure 2:
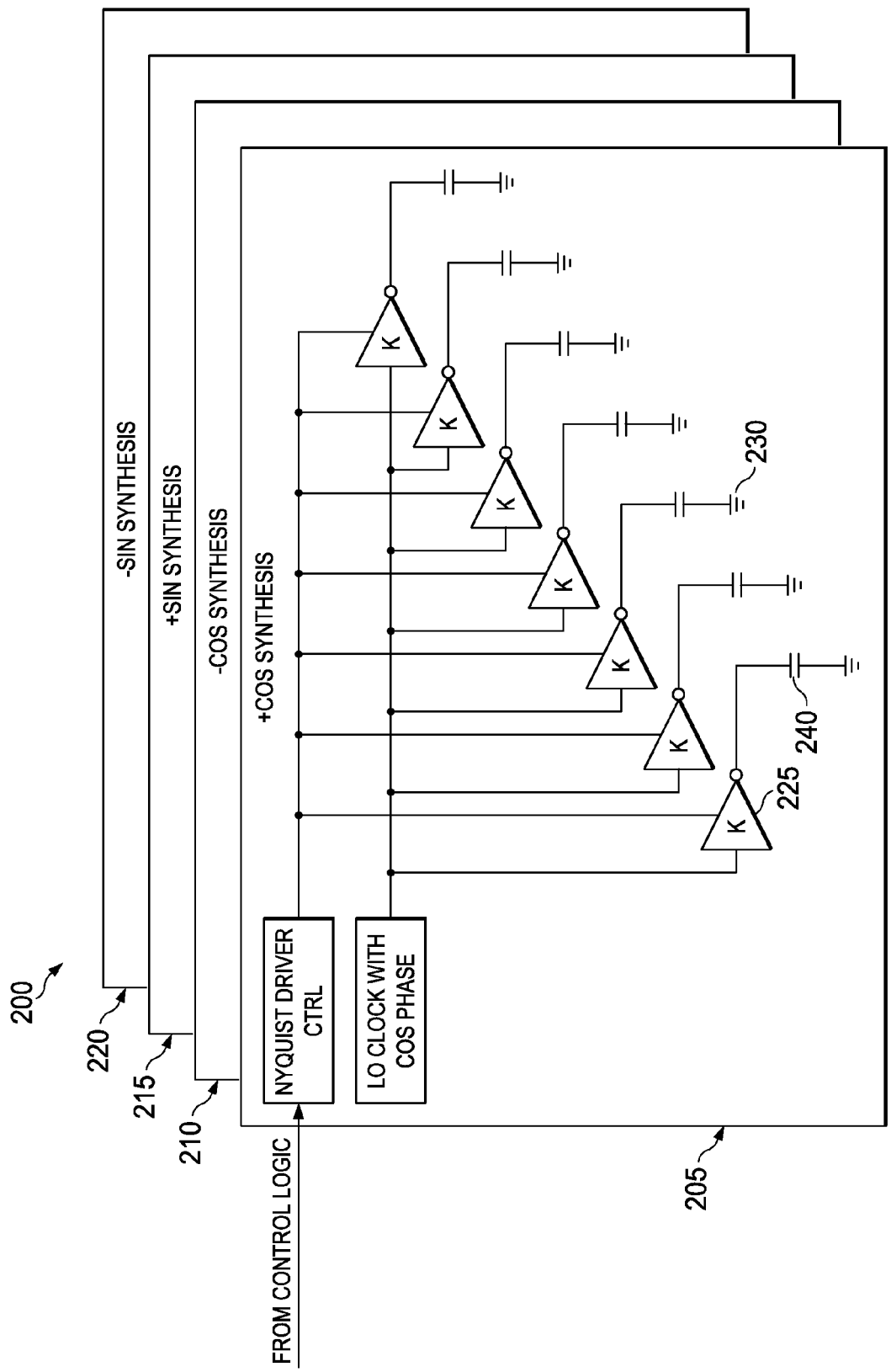
Figure 3:
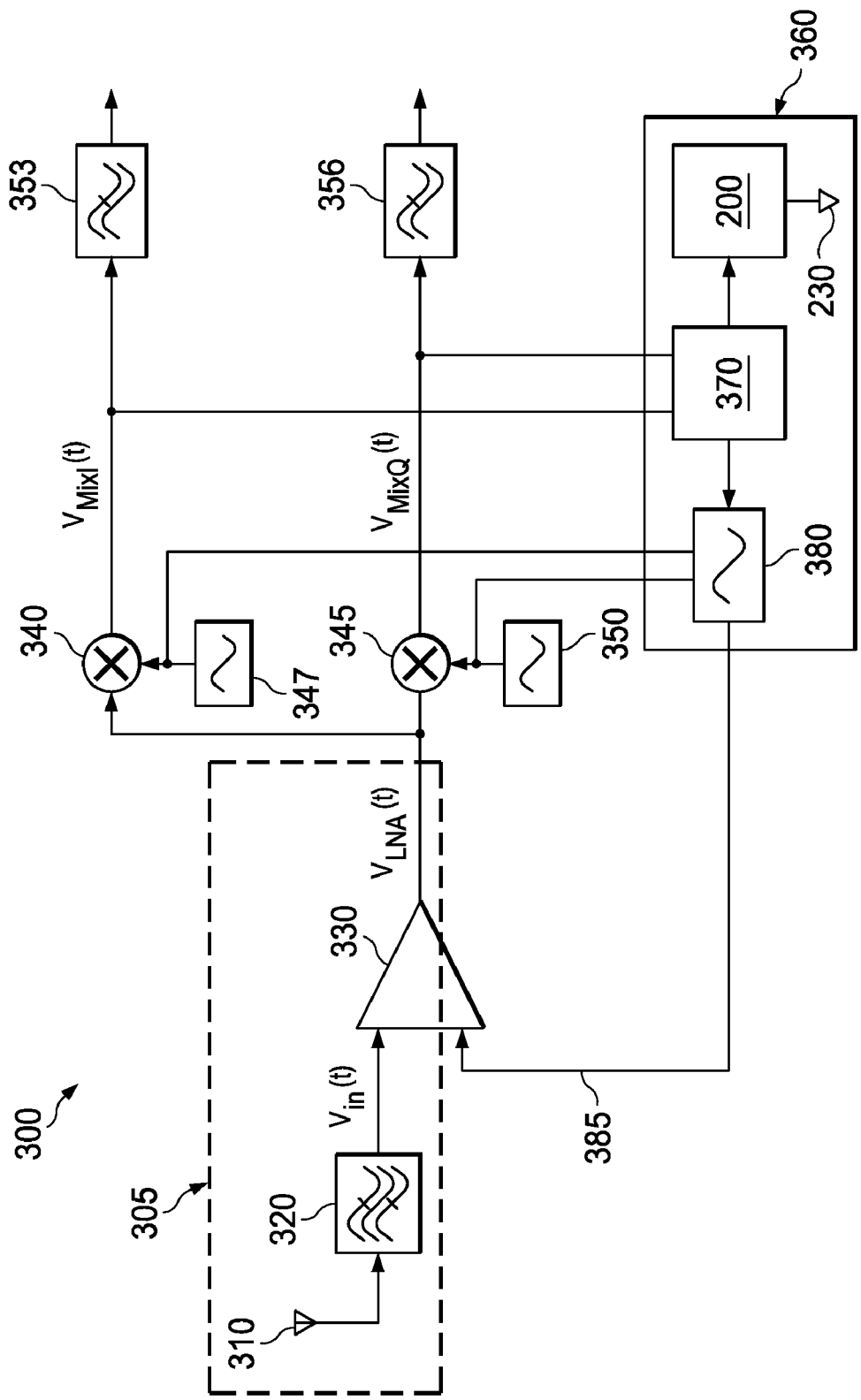
Figure 4A:
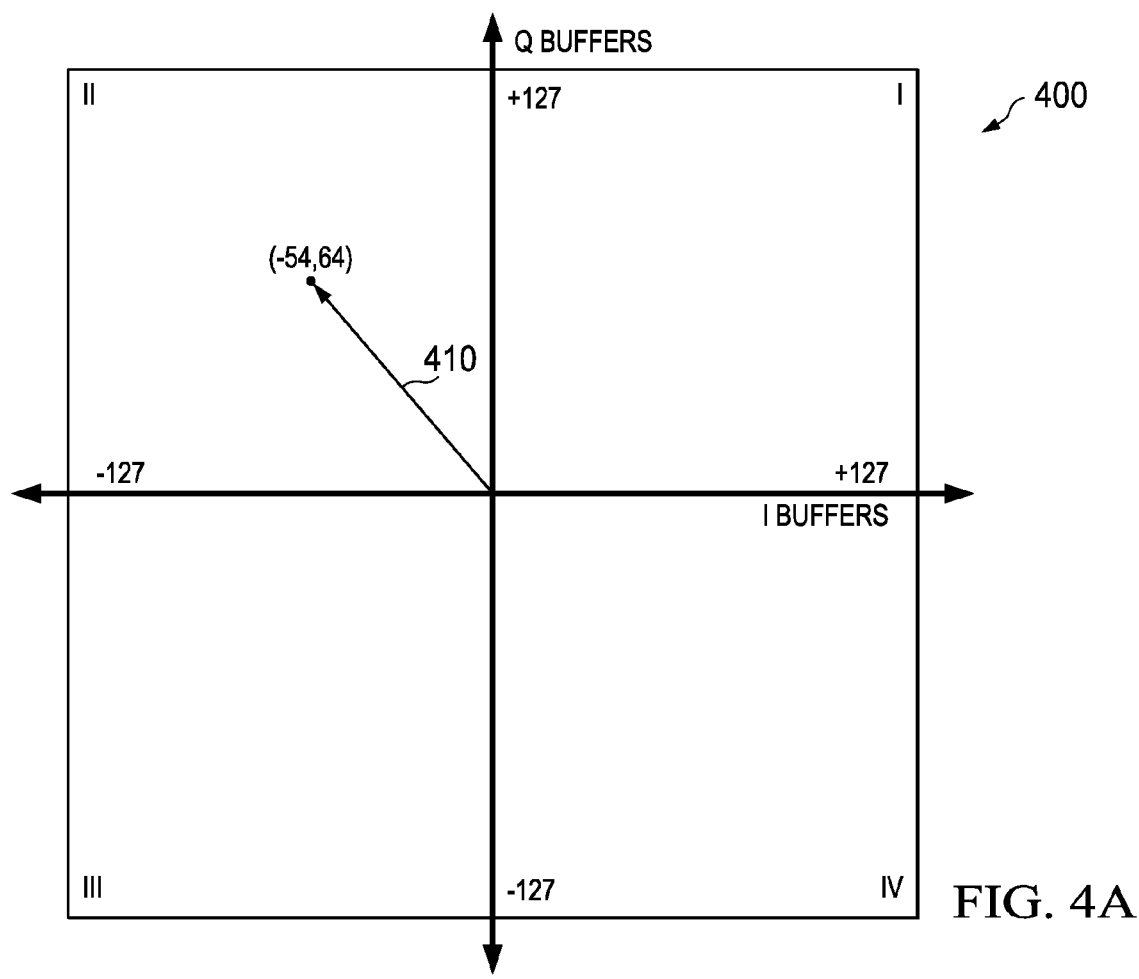
Figure 4B:
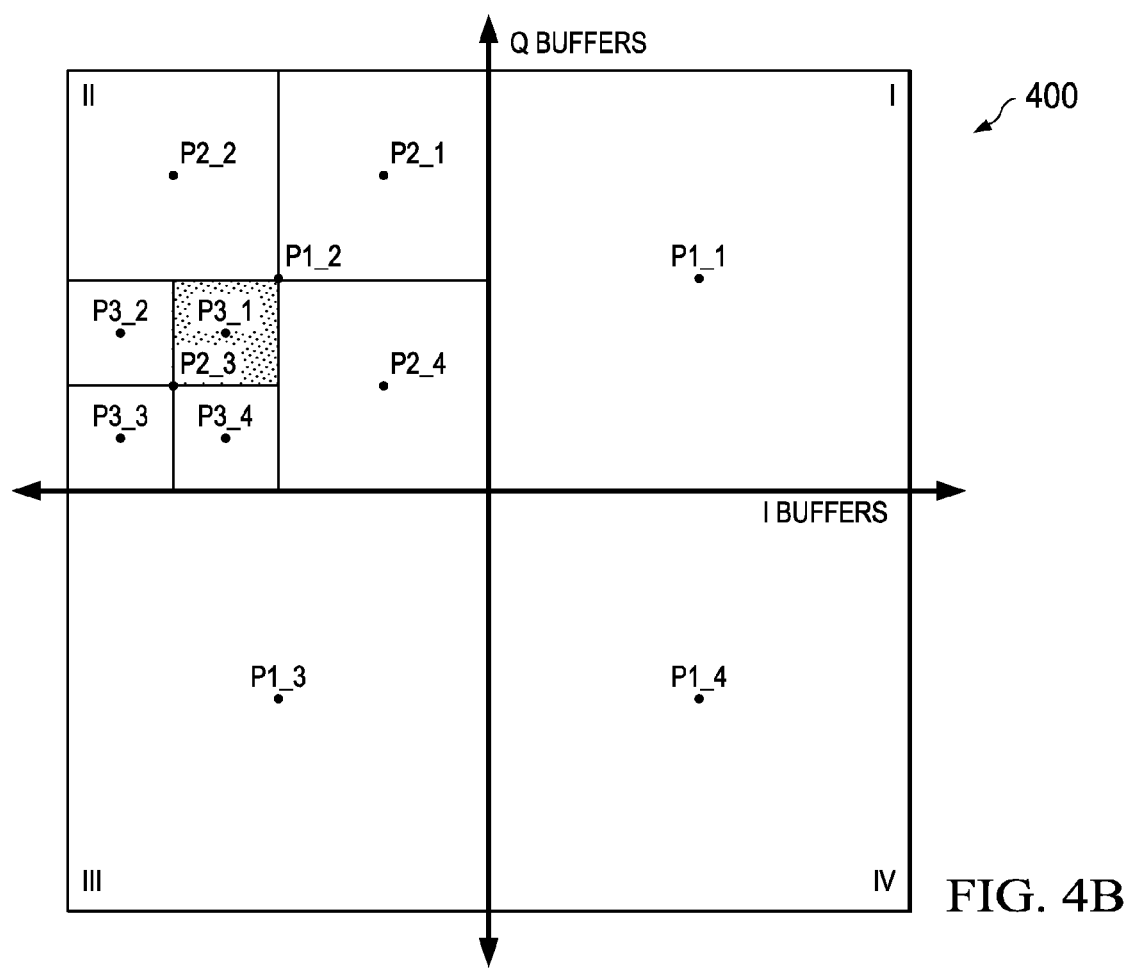
Figure 5:
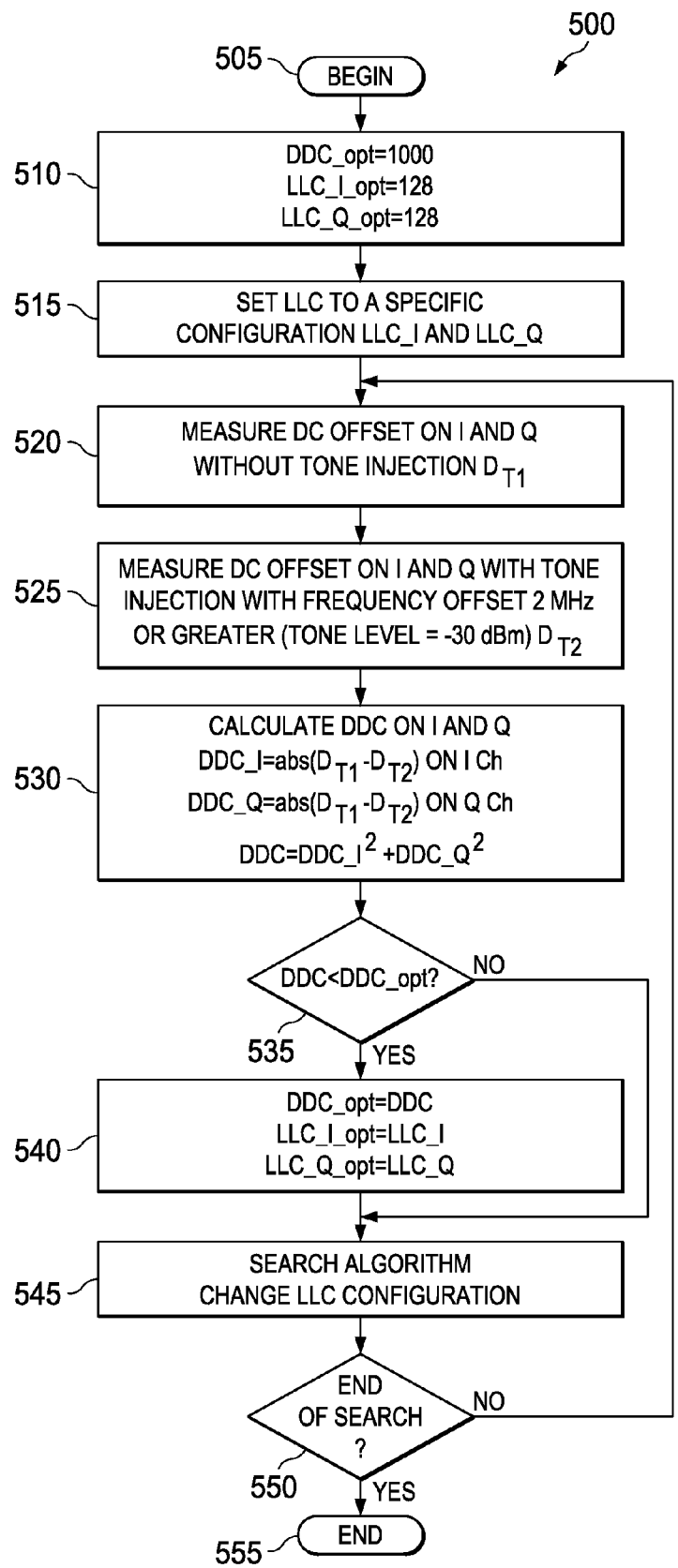

Reference is now made to the following descriptions taken in conjunction with the accompanying drawings, in which:

FIG. 1 illustrates IP2 and IIP2 of an amplifier gain;
FIG. 2 illustrates a spur tone suppression system;
FIG. 3 illustrates a calibration system constructed according to the principles of the disclosure;
FIG. 4A illustrates an I-Q operating space of the spur tone suppression system;
FIG. 4B illustrates iteratively dividing the I-Q operating space into successively smaller quadrants; and
FIG. 5 illustrates a method of increasing linearity of a receive path.

DETAILED DESCRIPTION

Embodiments described herein employ a technique of using an adaptive spur suppression system to provide a spur reduction tone to an RF receive path to increase linearity of the path. This technique also provides the ability to efficiently and rapidly determine the phase and amplitude of the spur reduction tone.

Methods have been developed to reduce the effect of noise spurs caused by switching power supplies on such transceivers. One method involves injecting an anti-spur current into the ground of the transceiver. The anti-spur current is adaptively configured to partially cancel the noise spurs caused by the switching power supply. Such a method is described in U.S. patent application Ser. No. 11/679,119 (the '119 application) filed on Feb. 26, 2007, and incorporated by reference herein in its entirety.

Sources of periodic signals may also result in noise spurs. For example, a local oscillator (LO) may operate with a frequency $\omega_{LO}$ in an RF receive path to down convert a received RF signal. Periodic variation of the current draw of the LO may cause noise spurs in the power supply ground that affect other components. In particular, the LO noise spur may couple into an amplifier in the receive path. The LO noise spur may then produce a signal component in the output of the amplifier. This phenomenon is referred to herein as "LO leakage." LO leakage may have the effect of reducing the linearity of the amplifier gain characteristic, thereby reducing the linearity of the receive path as a whole.

Linearity in the receive path may be characterized by a parameters referred to as IP2 and IIP2. The gain of the amplifier may be represented as a Taylor series expansion:

$$v_{out}(t) = a_1 v_{in}(t) + a_2 v_{in}^2(t) + a_3 v_{in}^3(t) \qquad \text{Eq. 1}$$

In Eq. 1, $a_1$ is the linear coefficient and $a_2$ is the quadratic coefficient. For an ideal linear amplifier, $a_2$ and higher-order coefficients are identically zero, though in practice these coefficients have a non-zero value. FIG. 1 illustrates a linear contribution and a quadratic contribution of an example Taylor series expansion. The non-zero intersection of the linear and quadratic contributions is known as the second order intercept point, or IP2. The input power corresponding to IP2 is known as IIP2. IP2 is often used as a performance parameter of an RF amplifier. The greater is IP2, the higher is the linearity of the amplifier. Conversely, the lower is IP2, the greater is the nonlinearity of the amplifier. Similarly, parameters IP3 and IIP3 are determined from the intercept of the linear contribution and the third-order contribution.

The '119 application describes a spurious tone suppressor that injects a spur-cancelling signal into a system ground with an amplitude and phase that are the inverse of a spur signal to be cancelled. The magnitude and phase of the spur-cancelling signal are controlled by controlling the amplitude of an in-phase (I) and quadrature-phase (Q) signal generator. A set of I buffers injects current spikes with 0 or 180 degree phase at an RF frequency corresponding to the frequency of the spur.

A set of Q buffers injects current spikes with 90 or 270 degree phase at the same frequency. The relative drive levels of the I and Q buffers determines the amplitude and phase of an anti-spur injected into the power supply ground.

FIG. 2 illustrates an example spurious tone suppressor 200, also sometimes referred to herein as an LO leakage cancellation (LLC) circuit 200. Relevant aspects of the tone suppressor 200 are described herein. Additional details of the operation of the tone suppressor 200 are described in the '119 application. The tone suppressor 200 is illustrated schematically including four banks of binary-weighted buffers. An I+ bank 205 is configured to produce a +cos signal (0 degrees phase) with respect to a local oscillator such as an I LO 347 (see FIG. 3). An I– bank 210 is configured to produce a –cos signal (180 degrees), a Q+ bank 215 is configured to produce a +sin signal (90 degrees), and a Q– bank 220 is configured to produce a –sin signal (270 degrees). In some embodiments of the tone suppressor 200 the 0 and 180 degree phase clocks are multiplexed to a single bank of buffers for each of sin and cos.

Each bank includes a number of binary weighted buffers 225. The illustrated embodiment includes, e.g., seven buffers 225 in each bank. Thus each bank may produce 128 signal levels. Of course, fewer or more buffers may be used when desired. Each positive/negative bank pair, e.g., the first and second banks 205, 210, may then produce 255 signal levels, as the level zero overlaps. An appropriately phased clock based on the LO is input to each bank of buffers 225. Thus, each buffer 225 of the I banks 205, 210 receives an I-phased clock, e.g., $\cos(\omega_{LO}t)$, at its input. Similarly, each buffer 225 of the Q banks 215, 220 receives a Q-phased clock, e.g., $\sin(\omega_{LO}t)$, at its input.

Each buffer 225 may be individually turned on by a control signal. In the illustrated embodiment, the control signal is provided by a Nyquist driver, though those skilled in the art will appreciate that other configurations are possible. When a buffer 225 is turned on, the rising edge of the input (LO) signal creates a current surge through transistors of the inverter that couple to the system power supply. The current surge depends on the rise time of the LO and provides the power supply with a current impulse that is phase-aligned with the LO. The coupling of the current impulse to a system ground 230 is represented by capacitors 240 between at the outputs of the buffers 225.

In an example of the operation of the tone suppressor 200, if a single buffer 225 in the bank 205 (I+) is turned on, the system ground 230 will receive periodic impulses that are phase-aligned with the I+ LO. If a single buffer 225 in the bank 215 (Q+) is turned on, the periodic impulses from the Q+ buffer 225 will be phase aligned with the Q+ LO. Similarly, periodic impulses that are phase aligned with I– or Q– may be injected into the power supply.

If I+ and Q+ buffers 225 are turned on simultaneously, the system ground 240 will receive two impulse sequences. One sequence will be phase-aligned with I+, and the other sequence will be phase-aligned with Q+. Both sequences will have the same period between impulses, but the impulses of the Q+ sequence will lag the I+ sequence by 90 degrees. The impulses will be integrated by the distributed reactance of the system. Thus, if both impulse sequences have the same amplitude, an impulse results having a vector of 45 degree phase relative to the LO.

FIG. 4A illustrates an I-Q operating space 400 of the tone suppressor 200, also referred to as the I-Q operating space 400. The I-Q plane has an extent determined by the number of buffers 225. In the illustrated example, a configuration of seven buffers in each of the banks 205, 210, 215, 220 results in an extent of ±127 units in the horizontal (I) axis and ±127 units in the vertical (Q) axis. Multiple buffers 225 may be simultaneously turned on to control the amplitude (and power) of an injected anti-spur tone. A combination of amplitude control and appropriate selection of banks 205, 210, 215, 220 enables the generation of an anti-spur tone at $\omega_{LO}$ with a pseudo-arbitrary waveform at the LO frequency. The waveform is referred to herein as an anti-spur tone.

A vector 410 as an illustrative example of a periodic waveform. The vector 410 is generated with an I impulse magnitude of –54, and a Q impulse magnitude of 64. The vector 410 thus has a magnitude of about 84 units and a phase of about $0.72\pi$ relative to the LO. The amplitude is determined by the scaling of the buffer 225 outputs.

The inventors have recognized that the linearity of the receive path, e.g., the receiver amplifier (such as a low noise amplifier (LNA) of a direct conversion receiver) and/or a mixer following the amplifier, can be advantageously increased by using the spurious tone suppressor to counter the effect of LO leakage in the amplifier. Embodiments described herein increase IIP2 by more than 10 dB in some applications. In some cases, it is desirable to have the ability to reconfigure the spur suppression system dynamically in "real time" in response to changing spur generation conditions. For example, an automatic gain control (AGC) associated with an RF front-end receiver may cause the linear and quadratic coefficients of the gain characteristic to change over time. When dynamic reconfiguration is desired, a search for an optimum configuration of the spur reduction system that maintains the greatest linearity of a receiver amplifier may not be practicable in the time between desired updates. Thus, embodiments described herein provide a method for calibrating a spurious tone suppressor that rapidly and efficiently determines a configuration of I and Q spur suppression systems to minimize nonlinearity, e.g., maximize IP2. Some embodiments employ a calibration method based on a delta-DC (DDC) measurement technique, explicitly defined and described below.

FIG. 3 illustrates an RF receiver 300 configured according to the disclosure. The RF receiver 300 may be, e.g., a component of a mobile communications device such as a mobile telephone. However, use of the RF receiver 300 is not limited to such devices. An embodiment of a direct conversion receiver architecture is presented for illustration, while recognizing that the disclosed principles may be practiced with other receiver architectures. A receive path 305 includes an antenna 310, a bandpass filter 320, and an amplifier 330. The band filter 320 receives an RF signal from the antenna 310 and filters the signal to produce a signal $V_{in}(t)$ input to the amplifier 330, which may be a low-noise amplifier (LNA). The RF signal may have, e.g., a carrier frequency of about 842 MHz. The LNA 330 amplifies $V_{in}(t)$ to produce $V_{LNA}(t)$.

$V_{LNA}(t)$ is input to an I mixer 340 and a Q mixer 345. The I mixer 340 receives an output from an I LO 347. The I mixer 340 outputs a $V_{MixI}(t)$ signal that represents an in-phase component of $V_{LNA}(t)$ converted to a baseband frequency. Similarly, the Q mixer 345 receives an output from a Q LO 350. The Q mixer 345 outputs a $V_{MixQ}(t)$ signal that represents an quadrature-phase component of $V_{LNA}(t)$ converted to the baseband frequency. A calibration system 360 employs the tone suppressor 200 to inject a current into the system ground 230 that is determined to beneficially increase the linearity of the receive path 305, and in particular the linearity of the LNA 330. $V_{MixI}(t)$ and $V_{MixQ}(t)$ may be filtered by low-pass filters 353, 356, respectively, to reduce high-frequency spectral components.

The calibration system 360 includes a controller 370 that receives and measures the $V_{MixI}(t)$ and $V_{MixQ}(t)$ signals using conventional means. The controller 370 controls a tone generator 380 to produce a test tone 385 that is input to the LNA 330. The tone generator 380 receives the outputs from the I LO 347 and the Q LO 350. The test tone 385 has a magnitude and phase, and may use the output of the LOs 347, 350 as reference signals in generating the test tone. In one embodiment, the test tone is a continuous wave (CW) tone with a frequency offset from the LO frequency. In an example embodiment, the frequency offset is about 6 MHz. Those skilled in the pertinent art will appreciate that other offset values may be used. In some embodiments, the offset is a value in the range from about 2 MHz to about 6 MHz. The controller 370 also embodies a search algorithm used to explore the I-Q operating space 400 of the tone suppressor 200, as described with respect to a method 500 below.

The following discussion of mathematical relationships within the RF receiver 300 is presented without limitation to facilitate the understanding of the various embodiments of the calibration system 360 described herein. These relationships are presented using the in-phase signal path as an example, are also applicable to the quadrature-phase path with suitable modification determinable by those skilled in the pertinent art.

The Taylor series of Eq. 1 includes linear and higher-order contributions of the receive path 305 and parasitic signal coupling paths to $V_{MixI}(t)$. If it is assumed that the receive path 305 has an infinite IIP2, then $a_1=0$ and the system is perfectly linear (ignoring terms with order greater than 2). In the presence of leakage of LO energy to the input of the LNA 330, $V_{in}(t)$ is assumed in general to be described by $$v_{in}(t) = A_L \cos(\omega_{LO}t + \phi_L) + A_m m(t)\cos[(\omega_{LO}+\omega_o)t + \phi_m(t)] \quad \text{Eq. 2}$$

The first operand is attributable to leakage energy from the I LO 347 into the receive path 305. The second operand of the sum is the signal output by the filter 320 in the absence of distorting effects, and may be thought of as a test tone. In Eq. 2, $A_L$ is a peak amplitude of the LO leakage;

$\omega_{LO}$ is the carrier frequency;

$\phi_L$ is the phase of the coupled LO leakage relative to the LO;

$A_m$ is a peak amplitude of the test tone 385;

m(t) is the modulating signal which equals unity for a single-tone test signal;

$\omega_o$ is the difference between the LO frequency and the frequency of the test tone 385; and $\phi_m(t)$ is a time-varying phase signal.

Substituting Eq. 2 into Eq. 1, the output of the I mixer 340 is described by, $$v_{MixI}(t) = \frac{1}{2}\left(a_1 + \frac{3}{4}a_3 A_L^2\right) A_L A_C \cos(\varphi_L - \varphi_C) + \quad \text{Eq. 3}$$
$$\frac{3}{4}a_3 A_L A_C A_m^2 m^2(t)\cos(\varphi_C - \varphi_L) +$$
$$\frac{1}{2}\left(a_1 + \frac{3}{2}a_3 A_L^2\right) A_C A_m m(t)\cos(w_o t + \varphi(t) - \varphi_C) + \dots$$

Frequency-dependent terms have frequencies of $\omega_o$ or $2\omega_o$ and can be filtered by a low pass filter at baseband. Among the DC bias terms of Eq. 3, two are considered further:

$$D_1 = \frac{1}{2}\left(a_1 + \frac{3}{4}a_3 A_L^2\right) A_L A_C \cos(\varphi_L - \varphi_C) \quad \text{Eq. 4}$$

and $$D_2 = \frac{3}{4}a_3 A_L A_C A_m^2 m^2(t)\cos(\varphi_C - \varphi_L) \quad \text{Eq. 5}$$

$D_1$ depends on the magnitude $A_L$ of the LO leakage to the receive path 305, and is always present. $D_2$ depends on both $A_L$ and the magnitude $A_m$ of the test tone 385. The values of $D_1$ and $D_2$ are determined in part by $A_L$, $A_m$ and $IIP_3$. In other words, the level of $D_1+D_2$ decreases as the $IIP_3$ of the receive path increases. Because $D_1$ is always present, $D_2$ alone can be used as a proxy for linearity of the receive path 305. Recall that a greater $IP_2$ represents a greater linearity of the receive path. This response of $D_1+D_2$ to $IP_2$ provides a means to determine which of two configurations of the tone suppressor 200 has a greater $IP_2$, i.e., is more linear. Comparing two configurations involves measurement of two DC biases, which are much simpler to implement than conventional alternatives such as tone estimation using a fast Fourier transform (FFT). Moreover, conventional techniques of measuring $IIP_2$ typically use a two-tone test. The relationship between $D_1+D_2$ and $IP_2$ indicates that only one tone is needed, providing a significant advantage over conventional techniques. However, embodiments are not limited to one-tone tests. In some cases, e.g., a two-tone test may be used with the described methodology using tone level estimation instead of DC estimation.

However, $D_1$ and $D_2$ are not easily measured directly. The measured value of $V_{Mix}$ generally includes a quantity $D_{rec}$, a DC bias attributable to the receive path from effects other that LO leakage. Thus, in the absence of the test tone 385, a measured DC bias value $D_{T1}$ includes an offset:

$$D_{T1} = D_1 + D_{rec} \quad \text{Eq. 6}$$

If the same gain configuration is used for the measurement of $V_{MixI}(t)$ while applying the test tone 385, the measured DC bias value $D_{T2}$ includes contributions from $D_1$, $D_2$ and $D_{rec}$. Thus, $$D_{T2} = D_1 + D_2 + D_{rec} \quad \text{Eq. 7}$$

A DDC value is the difference between $D_{T2}$ and $D_{T1}$:

$$DDC = D_{T2} - D_{T1} = (D_1 + D_2 + D_{rec}) - (D_1 + D_{rec}) = D_2 \quad \text{Eq. 8}$$

Eq. 8 shows that the contributions of $D_1$ and $D_{rec}$ cancel out in the computation of DDC, leaving only $D_2$. As discussed above, a smaller $D_2$ is correlated with a greater linearity of the receive path. This relationship, and the derivation of $D_2$ from quickly and easily measured quantities, provides a basis for a method to rapidly determine how $IP_2$ changes for different configurations of the tone suppressor 200. The DDC can be used to set the receiver to achieve its maximum IIP2. It may also be used as a parameter, or error signal, to assess the linearity of the receive path in the feedback loop provided by the calibration system 360.

FIG. 5 illustrates a method 500 according to the disclosure that may be implemented by the controller 370. The method 500 is described with concurrent reference to FIG. 4B, and is described in the context of the calibration system 360, including the controller 370. However, it is recognized that the method may be practiced with any system that provides functionality similar to that of the calibration system 360.

The method 500 begins with a step 505. In a step 510, variable values are initialized, including DDC_Opt, LLC_I_Opt, and LLC_Q_Opt. DDC_Opt stores the lowest value of DDC computed during execution of the method 500; LLC_I_Opt and LLC_Q_Opt respectively store the I and Q values of the location in the I-Q response space 400 that corresponds to the DDC_Opt value. In this embodiment, the optimum I/Q value is set to the upper right corner of the I-Q operating space 400. In a step 515, the calibration system 360 is set to an initial configuration. In some cases, an initial configuration includes setting is I=Q=64, corresponding to point P1_1 in FIG. 4B. Point P1_1 is located about at the center of quadrant I of the tone suppressor response space. In a step 520, the controller 370 measures the DC component of $V_{Mixt}(t)$ with the tone generator turned off. This value is designated $D_{T1}$. In a step 525, the controller 370 measures the DC component of $V_{Mixt}(t)$ with the tone generator 380 turned on. A frequency offset may be greater than about 2 MHz, and a tone level may be about −30 dBm. This value is designated $D_{T2}$.

In a step 530, the controller 370 computes a DDC value for the I and Q channels of the tone suppressor 200. In an example embodiment, DDC_I=ABS ($D_{T1}$−$D_{T2}$) on the I channel, and DDC_Q=ABS ($D_{T1}$−$D_{T2}$) on the Q channel. Note that while various aspects of the method described herein are described in the real domain for simplicity, in practice DC measurements are performed in the complex domain. An overall DDC is computed as the sum of the squared values of DDC_I and DDC_Q. The overall DDC is treated by later steps of the method 500 as an error signal. Those skilled in the pertinent art understand that other suitable error signals may be computed from DDC_I and DDC_Q, such as, e.g., root-mean-square.

In a decisional step 535, the DDC calculated in step 530 is compared to the optimal DDC stored previously, DDC_Opt. If the calculated DDC is less than the stored DDC_Opt, then the current configuration of the tone suppressor 200 results in greater linearity of the receive path than the configuration of the tone suppressor 200 corresponding to the stored values of LLC_I_Opt and LLC_Q_Opt. In such a case, the method 500 branches to a step 540 in which DDC_Opt is set to equal the DDC value computed in the step 535, LLC_I_Opt is set equal to LLC_I and LLC_Q_Opt is set equal to LLC_Q. The method 500 then continues to a step 545. If, in the step 535, the computed DDC is not less than the stored DDC_Opt, then the method 500 proceeds directly to the step 545 without performing the step 540.

In the step 545, the LLC 200 configuration is changed to a new configuration. This step is described further below. In a decisional step 550, the controller 370 determines if the search of the I-Q operating space 400 is complete, e.g., a local minimum of DDC has been located. If the search is complete, then the method 500 proceeds to a step 555, which ends the method 500. If the step 550 determines the search is not complete, then the method 500 continues to the step 520, at which $D_{T1}$ is measured using the new LLC 200 configuration determined at step 545.

The step 545 embodies the search algorithm determined to search the I-Q operating space 400 in a desired manner. In many cases, a desirable search algorithm will result in the shortest time to determine an optimum operating point of the tone suppressor 200 within the I-Q operating space 400. However, embodiments are not limited to those resulting in the shortest search time.

In one embodiment, the search algorithm divides the I-Q operating space 400 into successively smaller quadrants. For example, in a first iteration, the method 500 may compute the DDC for each of four points representing the approximate center of quadrants I, II, III and IV of the I-Q operating space 400. These points are illustrated in FIG. 4B as P1_1, P1_2, P1_3 and P1_4, respectively. After four invocations of the decisional step 535, the stored DDC will be the DDC corresponding to the point of the set of points P1_1, P1_2, P1_3 and P1_4 that results in the greatest linearity of the receive path. For illustration purposes, point P1_2 is taken to be the point with the lowest DDC value.

The search algorithm then divides quadrant II of the I-Q operating space 400 into four sub-quadrants, with center points designated P2_1, P2_2, P2_3 and P2_4 in FIG. 4B. The center points P2_1, P2_2, P2_3 and P2_4 respectively correspond to (I,Q) coordinates of about (−32, 96), (−96,−96), (−96, 32) and (−32, 32), assuming the maximum value of each of I and Q is ±127. The method 500 repeats the calculation of DDC for each of the points P2_1, P2_2, P2_3 and P2_4. After these calculations, DDC_Opt holds the value of the DDC corresponding to the point of the set of points P2_1, P2_2, P2_3 and P2_4 with the greatest linearity of the receive path. LLC_I_Opt and LLC_Q_Opt respectively hold the value of I and Q of the tone suppressor 200 that results in the minimum DDC computed up to this point. For illustration purposes, point P2_3 is taken to be the point with the lowest DDC value.

The search algorithm then divides the sub-quadrant of which point P2_3 is the center into four sub-quadrants with center points P3_1, P3_2, P3_3 and P3_4. Assuming I and Q may each have ±127 states, the center points correspond to (I,Q) values of (−80, 48), (−112, 48), (−112, 16) and (−80, 16). The algorithm continues by directing the method 500 to continue in this manner until a sub-quadrant 1 bit on a side is identified having the lowest computed DDC. This DDC value is taken as at least a local minimum of the I-Q operating space 400, and in many cases is expected to also be a global minimum of DDC in the I-Q operating space 400. The number of passes of the method 500 through the step 535 is no greater than 4 times the number of buffers 225 in each of the banks 205, 210, 215, 220, or 28 in this example. Thus, only 28 steps are needed to find an optimum operating set point for the tone suppressor 200 in an I-Q space of ~65000 operating points. Moreover, because the determination of the DDC value may be done quickly using the DDC computation method, the total time required to determine the optimum operating point of the tone suppressor 200 may be quite modest.

Those skilled in the art to which this application relates will appreciate that other and further additions, deletions, substitutions and modifications may be made to the described embodiments.

What is claimed is:

1. A method of increasing linearity of an RF signal receive path having a local oscillator operating at an LO frequency and a ground, comprising:
   measuring a signal amplified by said receive path;
   determining an error signal from said amplified signal that is representative of said linearity; and
   injecting an anti-spur tone into said ground that has a frequency about equal to said LO frequency and an amplitude and phase selected to increase said linearity.

2. The method of claim 1, wherein said measuring includes injecting a test tone into an amplifier in said receive path.

3. The method of claim 1, wherein said determining includes measuring said received signal with and without a test tone input to an amplifier in said receive path.

4. The method of claim 3, wherein said determining includes computing a difference between a DC bias voltage of said amplified signal with said test tone input to said amplifier and a DC bias voltage of said amplified signal without said test tone input to said amplifier.

5. The method of claim 1, wherein said injecting includes configuring a spurious tone suppressor to inject said anti-spur tone.

6. The method of claim 5, wherein said configuring includes iteratively dividing an I-Q operating space of said spurious tone suppressor into successively smaller quadrants.

7. The method of claim 1, wherein said receive path includes a filter, an amplifier and a mixer, and said received signal is measured at an output of said mixer.

8. The method of claim 1, wherein said receive path is a receive path of a mobile communications device.

9. A system for increasing linearity of an RF signal receive path, comprising:
- a spurious tone suppressor configurable to inject an anti-spur tone into a ground of said receive path;
- a tone generator configured to inject a test tone into an amplifier in said receive path; and
- a controller configured to determine an error signal based on said test tone, and to determine a configuration of said spurious tone suppressor in response to said error signal that increases said linearity.

10. The system of claim 9, wherein said error signal is derived from a signal amplified by said amplifier.

11. The system of claim 10, wherein said controller measures a DC bias voltage of said amplified signal.

12. The system of claim 11, wherein said controller determines said error signal by measuring said DC bias with and without said test tone injected into said amplifier.

13. The system of claim 9, wherein said test tone is injected into said amplifier.

14. The system of claim 11, wherein said receive path includes a mixer, and said DC bias is measured at an output of said mixer.

15. The system of claim 9, wherein said controller is configured to iteratively determine said error signal at a plurality of configurations of said spurious tone suppressor, and select a configuration that minimizes said error signal.

16. The system of claim 15, wherein said controller iteratively determines said error signal by dividing an I-Q response space of said spurious tone suppressor into successively smaller quadrants.

17. The system of claim 9, wherein said receive path is a receive path of a mobile communications device.

18. A mobile communications device, comprising:
- a receive path having a nonlinearity associated therewith, said path including:
  - a bandpass filter configured to receive an RF signal from an antenna and to produce a filtered signal;
  - a low-noise amplifier that accepts said filtered signal and a test tone; and
  - a mixer that receives an amplified signal from said low-noise amplifier and produces a down-converted signal, and
- a calibration system, comprising:
  - a spurious tone suppressor configurable to inject an anti-spur tone into a ground of said amplifier;
  - a tone generator configured to provide said test tone to said amplifier; and
  - a controller configured to measure a DC bias of said down-converted signal with and without said test tone input to said amplifier to determine an error signal, and to reconfigure said spurious tone suppressor to reduce said nonlinearity by reducing said error signal.

19. The mobile communications device of claim 18, wherein determining said error signal includes computing a difference between said DC bias while said test tone is input to said amplifier and said DC bias while no test tone is input to said amplifier.

20. The mobile communications device of claim 18, wherein said controller configures said spurious tone suppressor by iteratively measuring said error signal at a center point of successively smaller quadrants of an I/Q operating space of said spurious tone suppressor.

* * * * *